United States Patent [19]

Zervos

[11] Patent Number: 5,963,562
[45] Date of Patent: Oct. 5, 1999

[54] PARAMETER ESTIMATION TECHNIQUES APPLICABLE TO MULTIPLE-SIGNAL COMMUNICATIONS MEDIA

[75] Inventor: Nicholas A. Zervos, Holmdel, N.J.

[73] Assignee: Lucent Technologies Inc., Murray Hill, N.J.

[21] Appl. No.: 08/923,354

[22] Filed: Sep. 4, 1997

[51] Int. Cl.[6] .................... H04J 1/00; H04B 17/00
[52] U.S. Cl. .......................... 370/480; 455/67.1
[58] Field of Search .................... 370/480, 483, 370/252; 375/343, 261; 348/6, 10; 455/3.1, 6.1, 6.3, 6.2; 364/728.07

[56] References Cited

U.S. PATENT DOCUMENTS

| | | | |
|---|---|---|---|
| 3,626,168 | 12/1971 | Norworthy et al. | 702/57 |
| 4,445,223 | 4/1984 | Jasper et al. | 375/343 |
| 4,597,107 | 6/1986 | Ready et al. | 455/226.1 |
| 5,241,561 | 8/1993 | Barnard | 375/206 |
| 5,282,227 | 1/1994 | Crawford | 375/327 |
| 5,565,764 | 10/1996 | Priebe et al. | 324/76.21 |
| 5,809,064 | 9/1998 | Fenton et al. | 375/208 |

*Primary Examiner*—Dwayne D. Bost
*Assistant Examiner*—Raymond B. Persino
*Attorney, Agent, or Firm*—Steven R. Bartholomew

[57] ABSTRACT

Systems and methods for determining the spectral arrangement of a composite signal that includes a plurality of individual signals, so that one or more individual signals may be separated from the composite signal. According to one embodiment, a first set of samples are taken from the composite signal during a first time duration, and a second set of samples are taken from the composite signal during a second time duration. The first and second time durations are selected such that at least a portion of the second time duration does not temporally overlap the first time duration. A weighing function is applied to the first and second sets of samples to generate weighted sample sets. The autocorrelation between the first and second weighted sample sets is measured, thereby providing information about the bandwidth occupancies of each of a plurality of individual signals within the bandwidth of the composite signal.

8 Claims, 6 Drawing Sheets

FIG. 6A SIGNAL 1

FIG. 6B SIGNAL 2

FIG. 6C COMPOSITE

FIG. 7A SIGNAL 2 BAUD=4Fc

FIG. 7B SIGNAL 2 BAUD= 2Fc

FIG. 7C COMPOSITE SIGNAL

PARAMETER ESTIMATION TECHNIQUES APPLICABLE TO MULTIPLE-SIGNAL COMMUNICATIONS MEDIA

BACKGROUND OF THE INVENTION

1. Field of the Invention

The invention relates generally to communications technology, and more particularly to techniques for characterizing a multiplicity of signals occurring on a given communications medium.

2. Description of Related Art

Presently-existing communications systems have been developed to convey a plurality of signals over a common communications medium. One example of such a communications system is conventional analog cable television, which transmits a plurality of analog audiovisual signals on a single coaxial cable. These systems essentially represent a type of frequency-division multiplexing, wherein a first analog communications channel is assigned a first frequency band, a second analog communications channel is assigned a second frequency band, and so on. More recently, mixed-signal communications systems have evolved which are equipped to convey digital, as well as analog, signals. Such digital signals may be employed, for example, to represent audiovisual information, data, and/or control signals. Note that the same modulation scheme need not be applied to all signals on a given communications medium. For example, some signals may be modulated using quadrature amplitude modulation (QAM), and other signals may be modulated using single sideband (SSB), vestigial sideband (VSB), pulse amplitude modulation (PAM), and/or FM.

Figure 1:
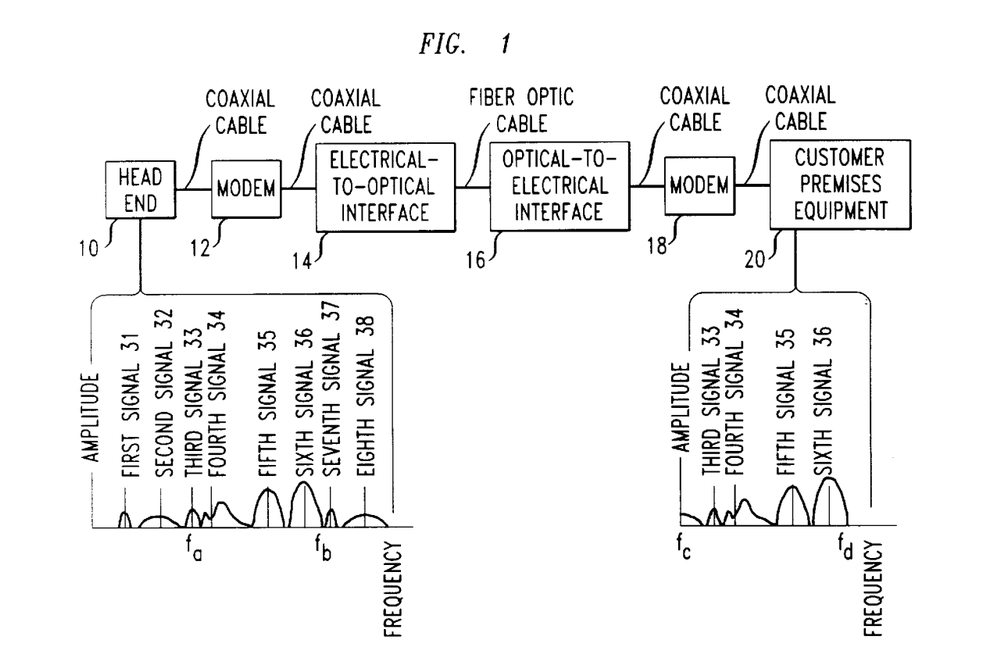
FIG. 1 is a hardware block diagram showing a prior-art cable television system that uses a composite signal.

FIG. 1 is an illustrative prior-art mixed-signal communications system. A composite signal includes a plurality of signals, such as first signal 31, second signal 32, third signal 33, fourth signal 34, fifth signal 35, sixth signal 36, seventh signal 37, and eighth signal 38. Fourth signal 34 may represent a conventional analog vestigial sideband (VSB) modulated television signal, second signal 32 may represent a QAM (quadrature amplitude modulated) channel of relatively wide bandwidth, and first signal 31 may represent a QAM channel of narrower bandwidth relative to the second signal 32.

Head end 10 is used to receive, process, and retransmit the composite signal. Head end 10 is coupled to the input of a modem 12 via a first section of coaxial cable. The modem 12 modulates the signals transmitted by head end 10 onto the first section of coaxial cable using conventional modem communications protocols. The output of modem 12 is fed to an electrical-to-optical interface 14 via a second section of coaxial cable. Electrical-to-optical interface 14 converts the electrical signals generated by modem 12 into optical pulses suitable for transmission over fiber-optic cable. If coaxial cable were used to convey signals over relatively great distances, signal attenuation could be a problem. The use of fiber-optic cable allows signal transmission over relatively large distances.

An optical-to-electrical interface 16 converts the optical pulses on the fiber optic cable back into electrical signals suitable for transmission over coaxial cable, in preparation for signal delivery to customer premises equipment 20. A section of coaxial cable links optical-to-electrical interface 16 to modem 18, and another section of coaxial cable links modem 18 to customer premises equipment 20. Modem 18 demodulates the signal on coaxial cable 40, so that a specified portion of the composite signal transmitted by head end 10 is delivered to customer premises equipment 20 over coaxial cable 41.

Modem 18 uses a tuning mechanism to demodulate the signal that will be sent to customer premises equipment 20. In practice, this tuning mechanism includes a mixer/oscillator stage that mixes signals within a specified bandwidth on coaxial cable 40 down to a lower frequency range. Since this mixer/oscillator stage is not synchronized with respect to head end 10, the modem 18 may provide a demodulated signal that has a frequency offset with respect to the signals originally transmitted by the head end 10.

Upon initial startup, the tuning mechanism may, due to unpredictable frequency offset adjustments, provide a composite signal mix to the customer premises equipment that contains only a portion of a QAM signal at the lower edge of the RF-demodulated frequency spectrum, as is shown in FIG. 1 just to the left of third signal 33 at customer premises equipment 20. This is an undesired situation, as the customer premises equipment 20 will not be able to properly process a QAM signal by receiving only the band edge of that signal. What is needed is automatic readjustment of the tuner mixer/oscillator stage, based upon a knowledge of the spectral arrangement of the composite signal, to ensure that all desired QAM signals are fully-contained within the available RF demodulation bandwidth.

SUMMARY OF THE INVENTION

At least one individual signal may be separated from a composite signal that includes a plurality of individual signals by taking a first and a second set of samples from the composite signal, applying a weighing function to the first and second sets of samples, and then measuring the autocorrelation between the weighted first set of samples and the weighted second set of samples, so as to determine the bandwidth occupancy of the at least one individual signal relative to the composite signal bandwidth. According to one embodiment, the first set of samples are taken during a first time duration. The second set of samples are taken during a second time duration, at least a portion of which does not temporally overlap the first time duration. The first and second sets of samples are multiplied by a weighing function to generate first and second weighted sample sets. The autocorrelation between the first and second weighted sample sets is measured, thereby providing information about the spectral arrangement of the composite signal, including the bandwidth occupancies of each of a plurality of individual signals.

DETAILED DESCRIPTION OF THE PREFERRED EMBODIMENTS

Figure 2:
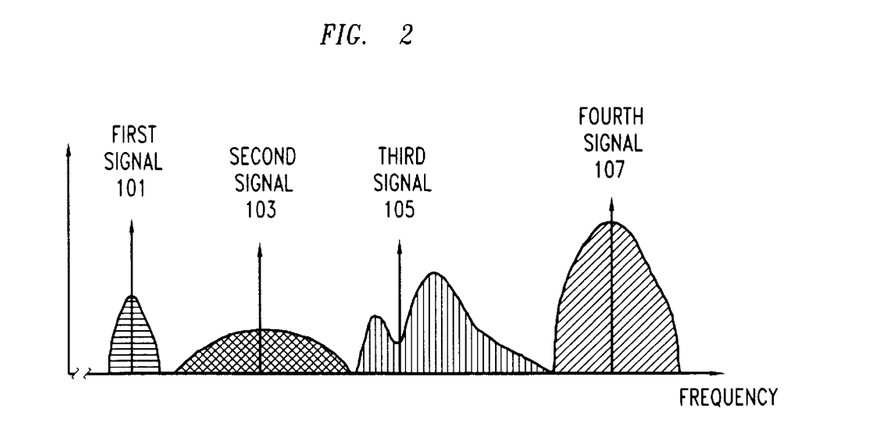
FIG. 2 is a block diagram setting forth an illustrative composite signal including a plurality of individual signals.

Statistical techniques are disclosed for identifying, in real time, the basic features of one or more individual signals that are embedded in a signal mixture including a plurality of independent signals. As shown in FIG. 2, the mixture of signals may include FM (frequency modulated) signals such as first signal 101, QAM (quadrature amplitude modulated) signals such as second signal 103, VSB (vestigial sideband) signals such as third signal 105, NTSC (North American Television Standards Committee) television signals, PAL signals, SECAM signals, and/or amplitude-modulated signals such as fourth signal 107.

Assume that a composite signal including a plurality of individual signals, such as first signal 101, second signal 103, third signal 105, and fourth signal 107, is placed onto a first end of a coaxial cable by an arbitrarily-determined configuration of transmitters and signal combiners. At the second end of the coaxial cable, it is desired to determine the characteristics of one or more of the individual signals on the coaxial cable so that a desired individual signal may be separated from the composite signal. Such a task is rendered all the more difficult due to the fact that each of the signals includes a number of unknown parameters. In the case of a QAM signal, the frequency of the carrier (i.e., the center frequency of the QAM signal) must be determined, as well as the baud rate, the overall bandwidth, and the nature of the QAM constellation.

The techniques disclosed herein determine the parameters of one or more individual signals of a composite signal by utilizing several concepts that are not well-understood in the prior art. First, open-loop carrier estimation of the parameters of any QAM signal has to be performed in the context of analog double-sideband carrier modulation, even if this QAM signal is the only signal present. In other words, the digital nature of a QAM signal is not important or critical for purposes of identifying the parameters of a QAM carrier. Secondly, despite the fact that a QAM signal includes time-varying information, it can be proved that the QAM signal contains a significant band-limited double-sideband stationary component which may be extracted by direct autocorrelation/power measurements. Third, the method of real-time autocorrelation measurements eliminates all independent types of interference incurred during the transmission process. Fourth, the effects of multipath that may be present in each of a plurality of QAM signals that comprise a given composite signal do not effect the carrier/bandwidth identification/equalization process. Fifth, the duration of the measured autocorrelation function is well-defined, finite, and it is defined by the QAM signal of minimal bandwidth in the signal composite, which, in one illustrative design specification, is equal to 1.5 microseconds (1/870 Khz).

Figure 3:
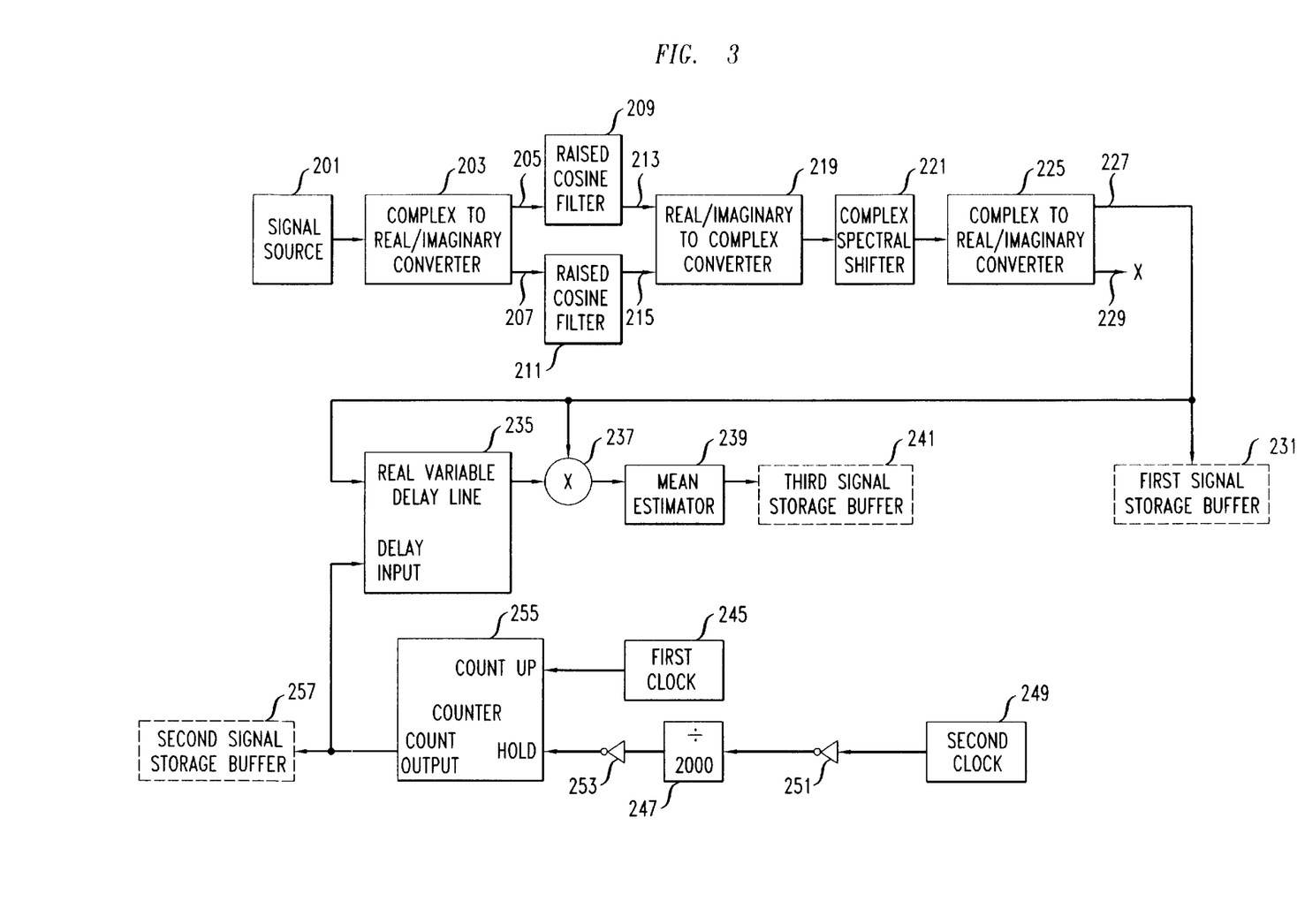
FIG. 3 is a block diagram showing a hardware configuration equipped to determine the spectral arrangement of a composite signal according to a first embodiment disclosed herein.

The five aforementioned concepts have been utilized to develop hardware configurations for systems that are equipped to characterize each of a plurality of individual signals from a composite signal. FIG. 3 illustrates such a system designed according to a first embodiment disclosed herein, and FIGS. 5A and 5B, taken together, illustrate a system designed according to a second embodiment disclosed herein. In practice, the hardware components of FIGS. 3, 5A, and 5B may be integrated into, and/or coupled to, modem 18 and/or customer premises equipment 20 (FIG. 1).

Referring now to FIG. 3, signal source 201 provides a composite signal that includes a plurality of independent signals. Examples of such signals were previously discussed in connection with FIGS. 1 and 2. The composite signal is coupled to a complex to real/imaginary converter 203, which separates the composite signal into a real part on signal line 205, and an imaginary part on signal line 207. The real part is processed by raised cosine filter 209, and the imaginary part is processed by raised cosine filter 211.

After filtering, the real part of the composite signal is fed to a real input 213 of a real/imaginary to complex converter 219, and the filtered imaginary part of the composite signal is fed to an imaginary input 215 of the real/imaginary to complex converter 219. The output of the real/imaginary to complex converter 219, representing a filtered, complex composite signal, is coupled to the input of a complex spectral shifter 221, and the output of complex spectral shifter 221 is coupled to a complex to real/imaginary converter 225. The imaginary output 229 of the complex to real/imaginary converter 225 is not used. The real output 227 of the complex to real/imaginary converter 225 is fed to the signal input of a real variable delay line 235, and also to a first input of a signal multiplier 237. An optional first signal storage buffer 231 may be used to store the real output 227 of the complex to real/imaginary converter 225. Real variable delay line 235 delays a real signal for a time duration determined by a time delay input signal present at a delay input 236 terminal.

The output of the real variable delay line 235 is fed to a second input of multiplier 237. Therefore, the output of multiplier 237 represents an input signal multiplied by a delayed version of itself. The output of the multiplier 237 is coupled to a mean estimator 239, and the output of the mean estimator 239 may be coupled to an optional third signal storage buffer 241.

The signal at the delay input 236 terminal of the real variable delay line 235 is provided by a counter 255. A first clock 245 is coupled to a count up terminal of counter 255 such that, when clock 245 generates pulses, the count of counter 255 is incremented. A second clock 249 drives a first inverter 251, a divide-by-2000 divider 247, and a second inverter 253, arranged sequentially in the order described. The output of the second inverter 253 drives a hold terminal of counter 255 which, when activated, causes the counter 255 to hold its present count. The output of the counter can be stored in an optional second storage buffer 257.

In the hardware configuration of FIG. 3, the complex to real/imaginary converter 203, raised cosine filter 209, raised cosine filter 211, real/imaginary to complex converter 219, complex spectral shifter 221, and complex to real/imaginary converter 225 together perform the function of a QAM (quadrature amplitude modulation) modulator and, hence, these components could, if desired, be replaced by a single functional block labelled "QAM modulator". Such QAM modulators are implemented, for example, on an integrated circuit chip.

The hardware configuration of FIG. 3 operates as follows. Assume that signal source 201 represents the output of modem 18 (FIG. 1) coupled to customer premises equipment 20. Upon initial startup, the RF demodulation performed by modem 18 may provide a composite signal having only a portion of a QAM signal included at the lowest frequency extreme, i.e., at the lowest band edge, of the RF-demodulated signal. Modem 18 demodulates signals by using a tuner mechanism that typically includes a mixer/oscillator stage for frequency-converting a composite input signal from a first frequency range to a second frequency range. However, note that modem 12 also includes a mixer/oscillator stage which, in the present example, modulates signals from head end 10. This modulation process involves frequency-converting signals from the head end 10 from a third frequency range to a fourth frequency range.

Since the mixer/oscillator stage of modem 12 is not synchronized with the mixer/oscillator stage of modem 18, any frequency discrepancy will cause the frequency spectrum of a given signal of the composite signal mix to be partially truncated. The frequency spectrum will be truncated at the lower band edge of the signal produced by modem 18. Automatic readjustment of the mixer/oscillator stage of modem 18 is then required to guarantee that all desired individual signals of the composite signal mix are fully contained within the available RF demodulation band of modem 18.

In order to properly adjust the mixer/oscillator of modem 18, a power measurement is conducted at the lower band edge of the RF-demodulated signal produced by modem 18. To obtain such a power measurement, mean estimator 239 measures the autocorrelation of a signal with a time-delayed version of that signal at a few frequency points, using real variable delay line 235 and multiplier 237. This autocorrelation measurement effectively performs a Discrete Cosine Transform (DCT) on the signal generated by modem 18 (FIG. 1) and represented as signal source 201.

In practice, the maximum duration of the autocorrelation is typically about 1.5 usec, and a typical sampling rate on the order of 30 Msamples/sec is used. These parameters require the computation of a very few points on a 45-point DCT. The result of the autocorrelation process, which may be stored in third signal storage buffer 241, is then used by modem 18. Modem 18 adjusts a mixer/oscillator that is coupled to, and/or integrated into, the modem, to a proper frequency. The frequency is adjusted such that substantially the entire bandwidth of a specified individual signal is included at the lower band edge of the passband that is demodulated by modem 18.

Once the frequency of the mixer/oscillator of modem 18 is properly adjusted so as to include substantially the entire bandwidth of a specified individual signal at the lower band edge of the demodulated passband, it is now necessary to identify the signal frequency domains for individual signals of the composite signal. These signal frequency domains specify, for example, the center carrier frequency of a given individual signal and the bandwidth of that signal. The real variable delay line 235 identifies the signal frequency domains for individual signals by performing autocorrelation measurements, at each of a plurality of time delays, in conjunction with multiplier 237 and mean estimator 239.

Figure 4A:
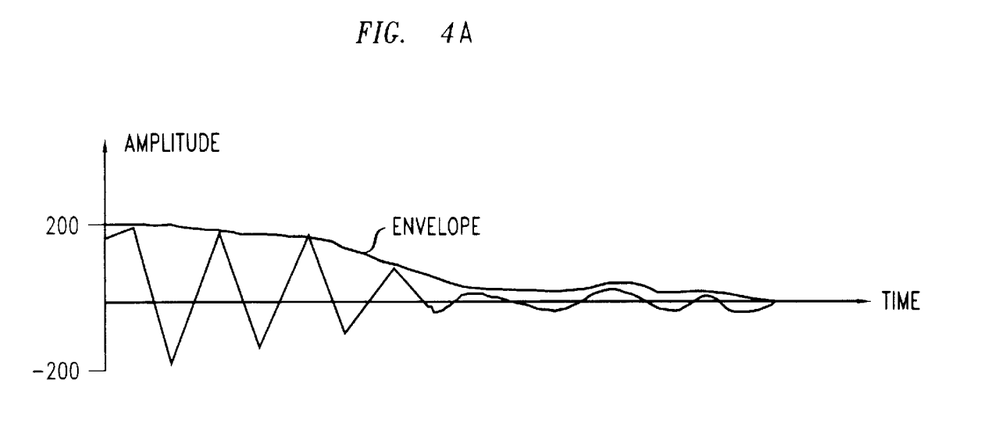
FIG. 4A is a plot showing amplitude versus time for an illustrative correlation measurement conducted using the hardware configuration of FIG. 3.

An example of an autocorrelation measurement is shown in FIG. 4A, as a function of amplitude over time. Note that the amplitude of the autocorrelation function initially starts out at a peak value. The autocorrelation then swings back and forth, from negative to positive values. However, as time increases, the negative and positive excursions decrease in amplitude until, eventually, the autocorrelation approaches zero as time approaches infinity. The envelope of the autocorrelation function decreases gradually over time from its peak value to zero.

Figure 4B:
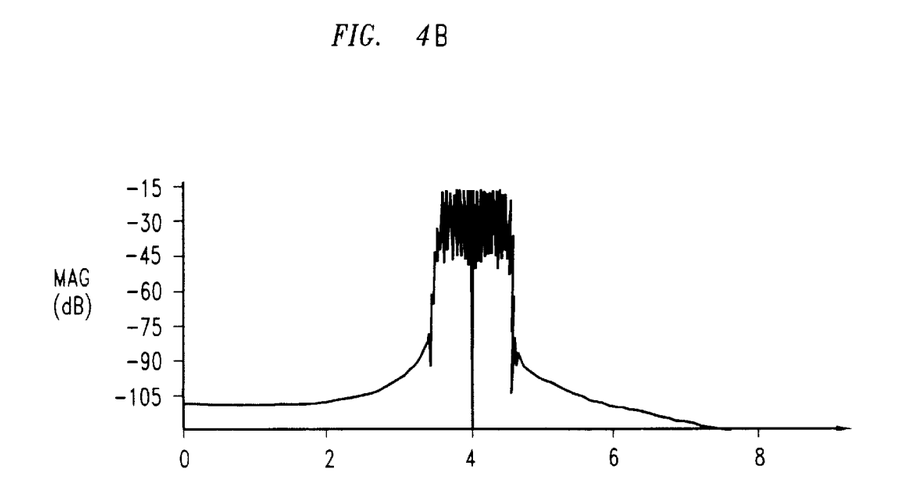
FIG. 4B is a plot of normalized frequency, showing the relationship between actual frequency and sampled frequency, using the hardware configuration of FIG. 3.

FIG. 4B is a plot showing amplitude versus normalized frequency for an illustrative signal. In this context, the normalized frequency is defined as the actual frequency spectrum of a signal divided by the frequency at which this spectrum is sampled. The plot of FIG. 4B shows a signal with a normalized center frequency of 4 Mhz and a bandwidth of about 2 Mhz (+ and −1 MHz). at FIGS. 5A and 5B together comprise a hardware block diagram of a system for characterizing each of a plurality of individual signals from a composite signal according to a second embodiment disclosed herein. Note that the hardware components of FIG. 5A and 5B may be integrated into, and/or coupled to, modem 18 and/or customer premises equipment 20 (FIG. 1).

Figure 5A:
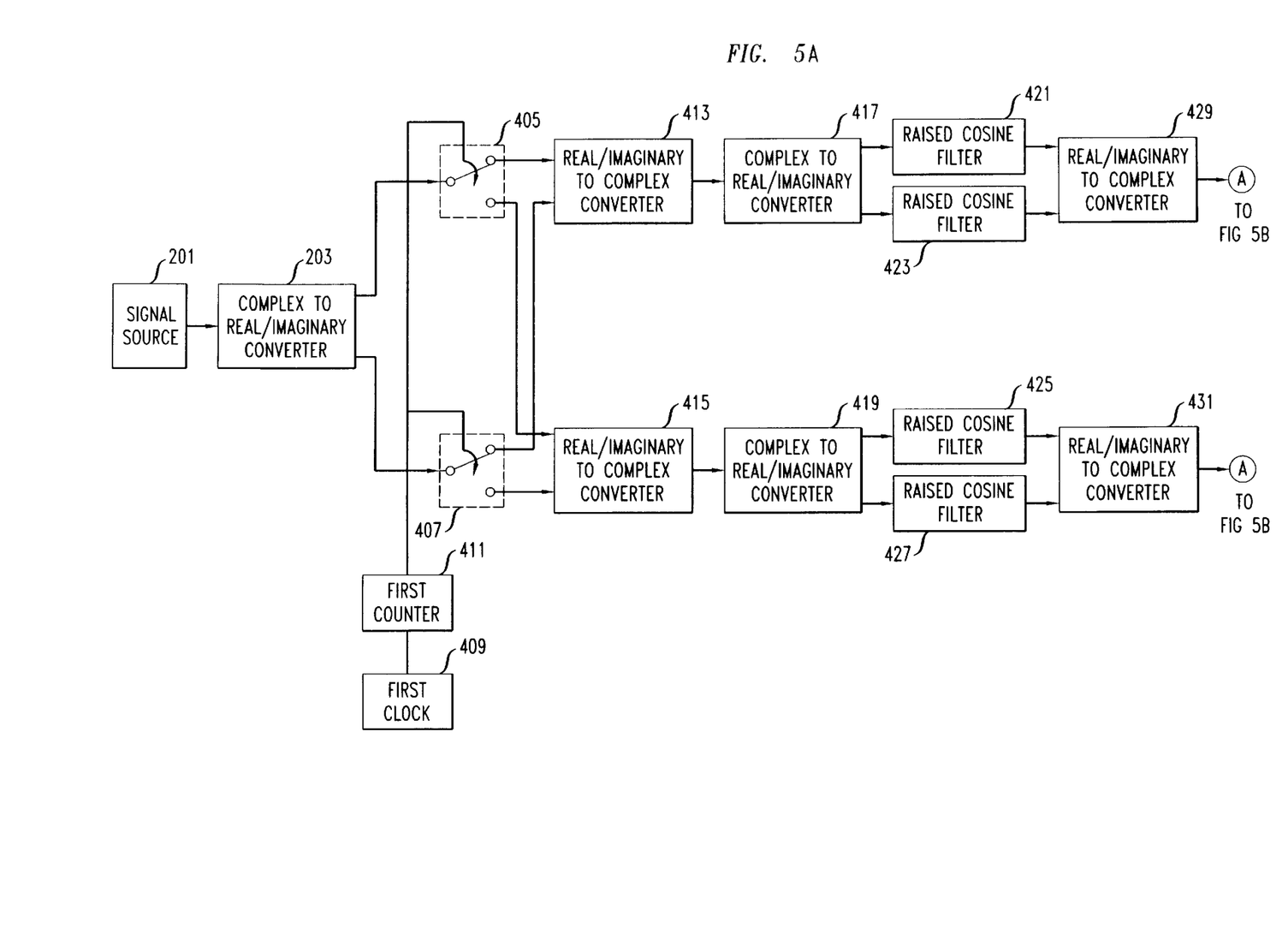
FIGS. 5A and 5B together comprise a block diagram showing a hardware configuration equipped to determine the spectral arrangement of a composite signal according to a second embodiment disclosed herein.

Referring now to FIG. 5A, signal source 201 provides a composite signal that includes a plurality of independent signals. Examples of such signals were previously discussed in connection with FIGS. 1, 2, and 3. The composite signal is coupled to a complex to real/imaginary converter 203, which separates the composite signal into a real part on signal line 205, and an imaginary part on signal line 207. The real part is passed to a pole of a first switch 405, and the imaginary part is passed to a pole of a second switch 407.

The states of the first and second switches 405 and 407 is controlled by a first counter 411 driven by a first clock 409. The first switch 405 and the second switch 407 each have two states. When the first switch 405 is in a first state, the pole is connected to a first contact, and the pole is not connected to a second contact. When the first switch 405 is in a second state, the pole is connected to the second contact but not to the first contact. Similarly, when the second switch 407 is in a first state, the pole is connected to a first contact, and the pole is not connected to a second contact. When the second switch 407 is in a second state, the pole is connected to the second contact but not to the first contact. In the example of FIG. 5A, when the first switch 405 is in the first state, the second switch 407 is also in the first state. When the first switch 405 is in the second state, the second switch 407 is also in the second state.

When the first and second switches 405, 407 are in the first state, the real and imaginary signals produced by the complex to real/imaginary converter 203 are processed by a first signal chain that includes a real/imaginary to complex converter 413, a complex to real/imaginary converter 417, a first pair of raised cosine filters 421, 423, a real/imaginary to complex converter 429, a first complex spectral shifter 433, and a complex to real/imaginary converter 437.

When the first and second switches 405, 407 are in the second state, the real and imaginary signals produced by the complex to real/imaginary converter 203 are processed by a second signal chain that includes a real/imaginary to complex converter 415, a complex to real/imaginary converter 419, a second pair of raised cosine filters 425, 427, a real/imaginary to complex converter 431, a second complex spectral shifter 435, and a complex to real/imaginary converter 439.

Figure 5B:
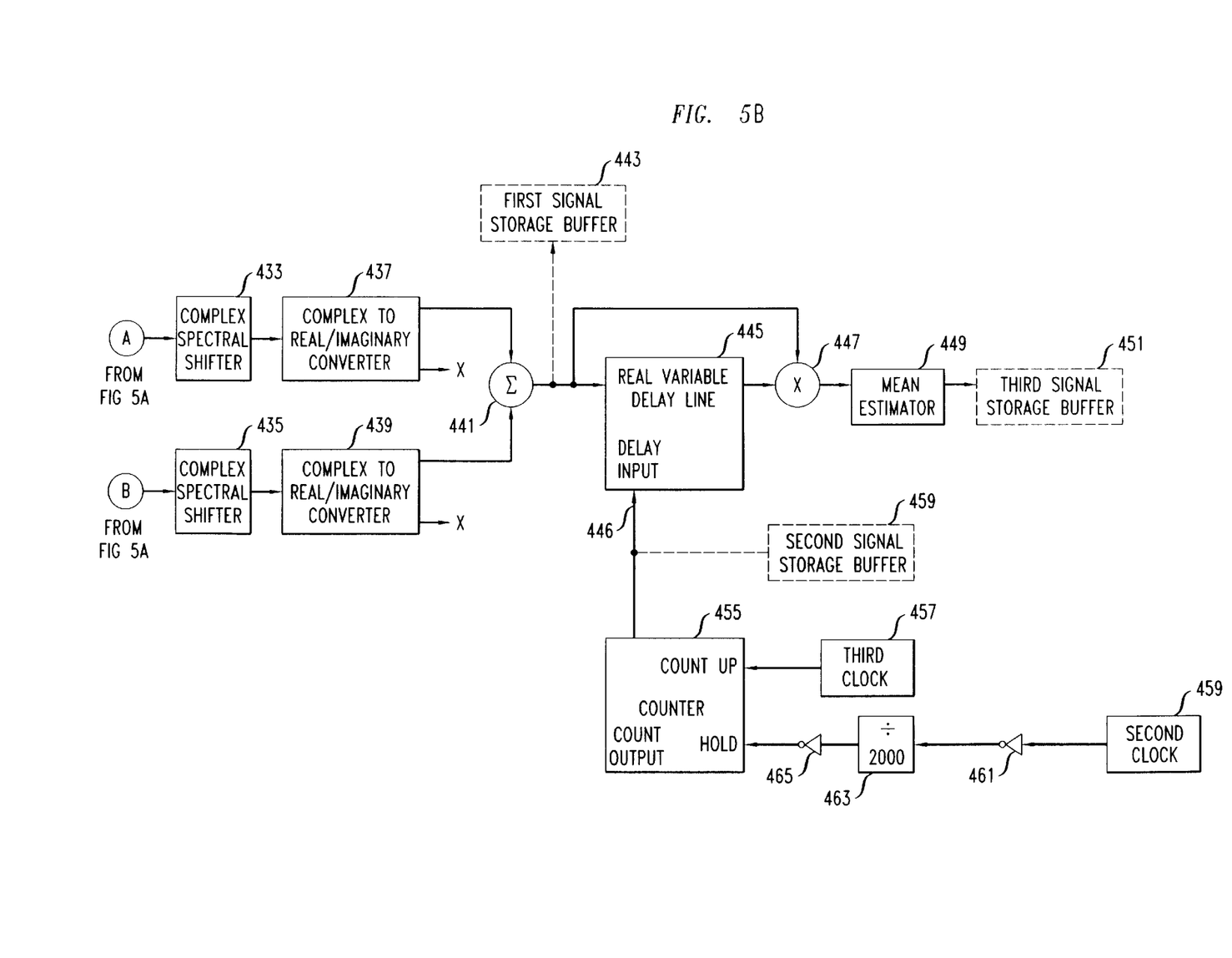

The real outputs of complex to real/imaginary converter 437 and complex to real/imaginary converter 439 are summed by summer 441. The imaginary outputs of the complex to real/imaginary converters 437, 439 are not used. The output of summer 441 is fed to the signal input of a real variable delay line 445, and also to a first input of a signal multiplier 447. An optional first signal storage buffer 443 may be used to store the output of summer 441. Real variable delay line 445 delays a real signal for a time duration determined by a time delay input signal present at a delay input 446 terminal.

The output of the real variable delay line 445 is fed to a second input of multiplier 447. Therefore, the output of multiplier 447 represents an input signal multiplied by a delayed version of itself. The output of the multiplier 447 is coupled to a mean estimator 449, and the output of the mean estimator 449 may be coupled to an optional third signal storage buffer 451.

The signal at the delay input 446 terminal of the real variable delay line 445 is provided by a second counter 455. A third clock 457 is coupled to a count up terminal of counter 455 such that, when third clock 457 generates pulses, the count of counter 455 is incremented. A second clock 459 drives a first inverter 461, a divide-by-2000 divider 463, and a second inverter 465, arranged sequentially in the order described. The output of the second inverter 465 drives a hold terminal of counter 455 which, when activated, causes the counter 455 to hold its present count. The output of the counter can be stored in an optional second storage buffer 459.

In the hardware configuration of FIGS. 5A and 5B, the complex to real/imaginary converter 417, raised cosine filters 421, 423, real/imaginary to complex converter 429, complex spectral shifter 433, and complex to real/imaginary converter 437 together perform the function of a first QAM (quadrature amplitude modulation) modulator and, hence, these components could, if desired, be replaced by a single functional block labelled "first QAM modulator". Similarly, the complex to real/imaginary converter 419, raised cosine filters 425, 427, real/imaginary to complex converter 431, complex spectral shifter 435, and complex to real/imaginary converter 439 together perform the function of a second QAM modulator and, hence, these components could, if desired, be replaced by a single functional block labelled "second QAM modulator". Such QAM modulators are implemented, for example, on an integrated circuit chip.

Figures 6A, 6B:
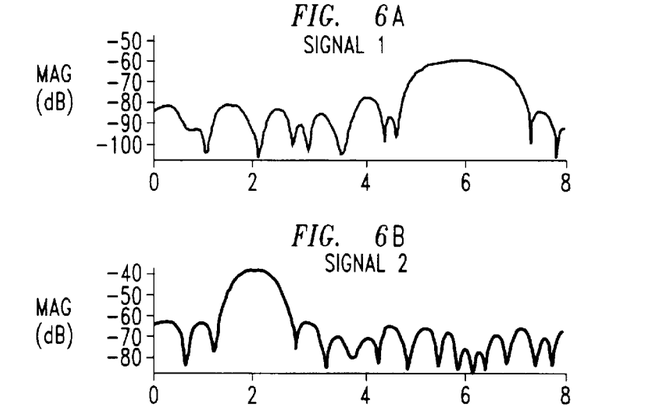
FIGS. 6A, 6B, and 6C show power spectra for the autocorrelation process implemented by the hardware configuration of FIGS. 5A and 5B.
Figure 6C:
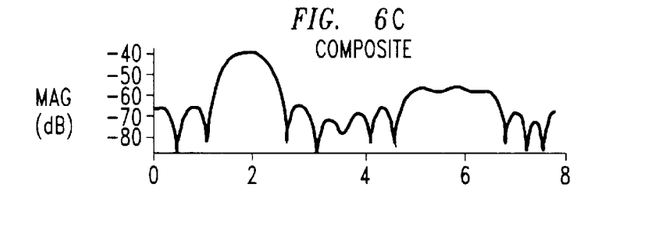

FIGS. 6A, 6B, and 6C show power spectra for the autocorrelation process implemented by the hardware configuration of FIGS. 5A and 5B. Magnitude in decibels is shown on the y-axis, and normalized frequency in MHz is shown on the x-axis. The spectra of FIGS. 6A, 6B, and 6C may be observed at the output of mean estimator 449 (FIG. 5B). The plot of FIG. 6A, for a first signal, shows a broad peak at a normalized frequency of 6 MHz, indicating the presence of a first individual signal having a normalized carrier frequency of 6 MHz. The plot of FIG. 6B, for a second signal, shows a broad peak at a normalized frequency of 2 MHz, indicating the presence of a second individual signal having a normalized carrier frequency of 2 MHz. FIG. 6C is a plot of the composite signal, showing a first peak at 6 MHZ, corresponding to the first signal, and a second peak at 2 MHZ, corresponding to the second signal.

Figure 7A:
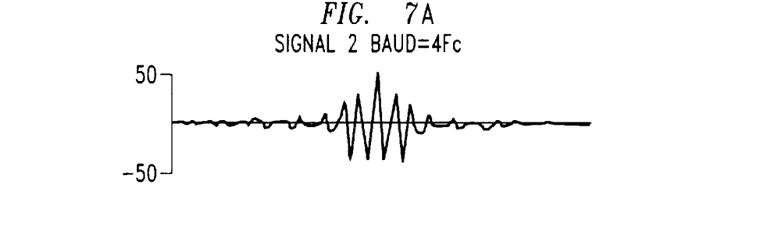
FIGS. 7A, 7B, and 7C show correlation functions for measuring autocorrelation as performed by the hardware configuration of FIGS. 5A and 5B.
Figure 7B:
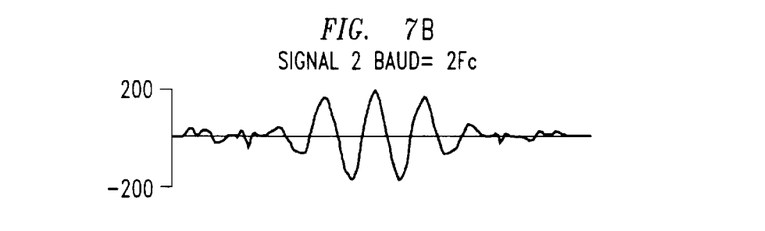
Figure 7C:
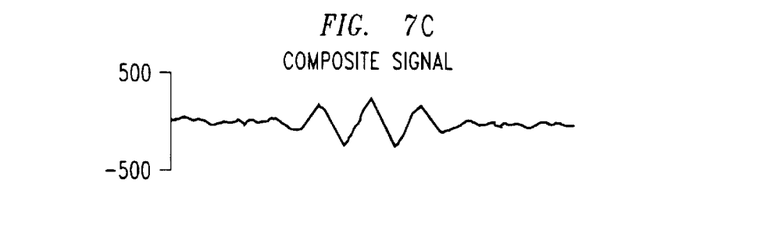

FIGS. 7A, 7B, and 7C are correlation functions for the autocorrelation process performed by the hardware configuration of FIGS. 5A and 5B. The plot of FIG. 7A corresponds to the first signal as shown in FIG. 6A. As revealed in FIG. 7A, the first signal has a normalized carrier frequency of 6 Mhz and a normalized baud rate of 4 Mhz. The plot of FIG. 7B corresponds to the second signal as shown in FIG. 6B. FIG. 7B reveals that the normalized carrier frequency of the second signal is 2 Mhz, and the normalized baud rate of the signal is 2 MHZ. FIG. 7C is a composite plot of the autocorrelation function that corresponds to the composite power spectrum of FIG. 6C.

We claim:

1. A system for separating one or more individual signals, each individual signal having a corresponding bandwidth occupancy, from a composite signal comprising a plurality of individual signals and having a composite signal bandwidth, the system including:

(a) a sampling device for taking a first set of samples from the composite signal during a first time duration, and a second set of samples from the composite signal during a second time duration, wherein the first and second time durations are selected such that at least a portion of the second time duration does not temporally overlap the first time duration;

(b) a sample weighing device for applying a weighing function to the first and second sets of samples to generate, respectively, first and second weighted sample sets; and (c) an autocorrelation measuring device for measuring the autocorrelation between the first and second weighted sample sets, so as to determine the bandwidth occupancies of the one or more individual signals relative to the composite signal bandwidth.

2. The system of claim 1 for use with a signal source that generates a real signal on a real signal line, and an imaginary signal on an imaginary signal line; the system CHARACTERIZED BY:

(a) a real variable delay line, coupled to the real signal line, for applying a specified delay to the real signal in response to a delay control signal, to generate a time-delayed signal;

(b) a multiplier having a first input coupled to the real signal, a second input coupled to the time-delayed signal, and a multiplier output; the multiplier output providing a multiplied signal that is the real signal multiplied by a delayed version of itself; and (c) a mean estimator, coupled to the multiplier output, for providing an output signal representing the autocorrelation of the composite signal.

3. The system of claim 1 for use with a composite signal that includes a plurality of independent QAM (quadrature amplitude modulated) signals each having a real component and an imaginary component, the system further including:

(a) a real variable delay line, coupled to the real component, for applying a specified delay to the real component in response to a delay control signal, to generate a time-delayed signal;

(b) a multiplier having a first input coupled to the real component, a second input coupled to the time-delayed signal, and a multiplier output; the multiplier output providing a multiplied signal that is the real component multiplied by a delayed version of itself; and (c) a mean estimator, coupled to the multiplier output, for providing an output signal representing the autocorrelation of the composite signal.

4. The system of claim 3 wherein the delay control signal is provided by:

(a) a first counter having a count-up terminal and a hold terminal; wherein the counter determines a time interval for which autocorrelation is measured; and (b) a first clock, coupled to a count up terminal of the first counter such that, when the first clock generates pulses, the count of the first counter is incremented.

5. A method for separating one or more individual signals, each individual signal having a corresponding bandwidth occupancy, from a composite signal that includes a plurality of individual signals and having a composite signal bandwidth, the method including the steps of:

(a) taking a first set of samples from the composite signal during a first time duration;

(b) taking a second set of samples from the composite signal during a second time duration, wherein the first and second time durations are selected such that at least a portion of the second time duration does not temporally overlap the first time duration;

(c) applying a weighing function to the first and second sets of samples to generate, respectively, first and second weighted sample sets; and (d) measuring the autocorrelation between the first and second weighted sample sets so as to determine the bandwidth occupancies of the one or more individual signals relative to the composite signal bandwidth.

6. The method of claim 5 wherein step (c) is performed after step (d) by applying the weighing function to the measurement of autocorrelation.

7. A method for separating one or more individual signals, each individual signal having a bandwidth occupancy, from a composite signal including a plurality of signals and having a composite signal bandwidth, the method including the steps of:

(a) taking a first set of samples from the composite signal during a first time duration;

(b) taking a second set of samples from the composite signal during a second time duration, wherein the first and second time durations are selected such that at least a portion of the second time duration does not temporally overlap the first time duration; and (c) measuring the autocorrelation between the first set of samples and the second set of samples, wherein the autocorrelation characterizes a spectral arrangement for the composite signal specifying the bandwidth occupancies of a plurality of individual signals relative to the composite signal bandwidth.

8. The method of claim 7 further including the step of weighing the first and second sets of samples either prior to, after, or simultaneously with, performing step (d).

* * * * *